UNITED STATES PATENT OFFICE.

WALTER M. RALPH AND LAWRENCE H. FLETT, OF BUFFALO, NEW YORK, ASSIGNORS TO NATIONAL ANILINE & CHEMICAL COMPANY, OF NEW YORK, N. Y., A CORPORATION OF NEW YORK.

PRODUCTION OF DISAZO DYE.

1,415,704.     Specification of Letters Patent.     Patented May 9, 1922.

No Drawing.     Application filed January 3, 1920. Serial No. 349,277.

*To all whom it may concern:*

Be it known that we, WALTER M. RALPH and LAWRENCE H. FLETT, citizens of the United States, residing at Buffalo, Erie County, State of New York, have invented certain new and useful Improvements in the Production of Disazo Dye; and we do hereby declare the following to be a full, clear, and exact description of the invention, such as will enable others skilled in the art to which it appertains to make and use the same.

The present invention relates to an improved method of making the new dyestuff described and claimed in Patent No. 1,363,886, granted December 28, 1920, which new dyestuff, in the free state, has the following probable formula:

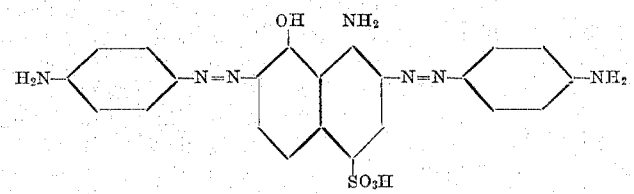

This new dye is a union dye, dyeing silk, cotton and wool, as well as mixtures of such fibres, producing in general greenish-black shades, and is capable of being diazotized and developed on the fiber of fabric with beta-naphthol, meta-phenlyene diamine, meta-tolylenediamine, etc., to give in general reddish to greenish shades of black.

The improved process of the present invention makes use of para-nitraniline, which is diazotized and coupled with 1.8-aminonaphthol-4-sulfonic acid (S-acid), and the nitro groups in the product so obtained then reduced, all as more fully hereinafter set forth and as claimed.

The invention will be further illustrated by the following specific example:

27.6 kg. (0.2 mol.) of para-nitraniline are dissolved in hot hydrochloric acid by heating to boiling with 110 kg. of hydrochloric acid (sp. gr. 1.19) and 110 liters of water. This solution is added while hot to a cold agitated solution of 13.8 kg. of sodium nitrite in 100 liters of water to which enough ice has been added to maintain the temperature in the neighborhood of 0°, continuing the addition until only a very faint but permanent reaction for nitrous acid is obtained with starch iodide paper. A solution of 24 kg. (0.1 mol.) of 1.8-aminonahpthol-4-sulphonic acid and 80 kg. of sodium carbonate in about 1200 liters of water is then slowly added to a greater part of the cold solution of diazotized p-nitraniline, the remaining, smaller, part of the diazotized p-nitraniline solution being held in reserve for the completion of the reaction as described below.

The coupling of one molecule of the diazotized p-nitraniline with the 1.8-aminonaphthol-4-sulphonic acid takes place at once in this mixture which is strongly acid with mineral acid. Concentrated sodium acetate solution, or solid sodium acetate, is then added until the solution becomes neutral to Congo red test paper. In the acetic acid solution thus produced, the second molecule of diazotized para-nitraniline couples with the monazo dye already formed, to form the disazo dye. The color of this disazo dye is blue in contradistinction to the red color of the monazo dye. The small reserve of diazotized p-nitraniline is now cautiously added until the solution contains a slight excess of diazotized p-nitraniline as shown by spotting on test paper and testing with an alkaline solution of R-salt. The monazo dye has now been completely converted into the disazo dye and since this disazo dye is insoluble in the dilute acetic acid, it is filtered off directly without the addition of salt.

After filtration, the dye is taken up in 2000 liters of hot water with the addition of a little sodium carbonate. The whole is heated to 50–60° C., and a solution of sodium disulphide is added until reduction of both nitro groups to amino groups is complete, that is, until a small sample when removed, diluted, and further heated with more sodium disulfide shows no further change. After cooling 4 kg. of solid sodium bisulfite is added and then dilute hydrochloric acid until the precipitation of the dye is complete. Excess of hydrochloric acid over that necessary for precipitation should be avoided. The dye is thus precipitated without any objectionable precipitation of sulfur. The dye is filtered off and if desired may be further purified by redissolving in water with the addition of a little sodium carbonate, reprecipitating with dilute hydrochloric acid, and refiltering. The dye is thus obtained in a free state.

From this specific description it will be noted that the hydrochloric acid solution of the p-nitraniline is added while hot to a cold solution of the sodium nitrite containing an excess of ice.

It will also be noted that the 1.8-aminonaphthol-4-sulfonic acid is added to the diazotized p-nitraniline, instead of vice versa, and that the coupling with two molecules of the diazotized-p-nitraniline, to form the disazo dye, though taking place in two chemical stages, constitutes but a single operation, while the small amount of the diazotized para-nitranilin held in reserve, is simply for use in more exactly completing the reaction and balancing up the quantities of the reacting substances.

It will be further noted that the reduction of the two nitro groups to amino groups is effected by means of sodium disulfide, and the reduced dye is isolated by the use of sodium bisulfite and dilute hydrochloric acid.

We claim:—

1. The method of diazotizing para-nitraniline which comprises adding a hot hydrochloric acid solution of the para-nitraniline to a cold solution of sodium nitrite and maintaining the temperature near 0° C. during the diazotization.

2. The method of producing a disazo dyestuff which comprises combining one molecular proportion of 1.8-aminonaphthol-4-sulfonic acid with one molecular proportion of diazotized para-nitraniline in a strongly acid medium, and combining the resulting monoazo dye with a second molecular proportion of diazotized para-nitraniline in a weakly acid medium.

3. The method of producing a disazo dyestuff which comprises adding one molecular proportion of 1.8-amino naphthol-4-sulfonic acid to a strongly acid solution containing about two molecular proportions of diazotized para-nitraniline, and subsequently making the solution weakly acid, whereby one molecular proportion of the diazotized para-nitraniline is coupled in a strongly acid medium and the second molecular proportion is coupled in a weakly acid medium.

4. The method of producing a disazo dyestuff which comprises adding a solution of one molecular proportion of the sodium salt of 1.8-amino naphthol-4-sulfonic acid, which solution contains sodium carbonate, to a cold solution of somewhat less than two molecular proportions of diazotized para-nitraniline containing an excess of hydrochloric acid, holding in reserve a small amount of the diazotized para-nitraniline solution, adding sodium acetate to the mixture to neutralize the excess hydrochloric acid and then adding the reserve of diazotized para-nitraniline to complete the coupling, whereby the coupling of one molecular proportion of the diazotized para-nitraniline takes place in a strong hydrochloric acid mixture, and the coupling of the second molecular proportion takes place in a weakly acid mixture containing acetic acid.

5. The method of producing a disazo dyestuff which comprises diazotizing para-nitraniline by adding a hot hydrochloric acid solution of the para-nitraniline to a cold solution of sodium nitrite and maintaining the temperature near 0° C., during diazotization, adding to the resulting hydrochloric acid solution a solution of the sodium salt of 1.8-amino naphthol-4-sulfonic acid and thereby combining one molecular proportion of the diazotized para-nitraniline with one molecular proportion of the 1.8-amino naphthol-4-sulfonic acid to form a monoazo dye, neutralizing the excess hydrochloric acid with sodium acetate to produce a mixture weakly acid with acetic acid and coupling the monoazo dye with a second molecular proportion of diazotized para-nitraniline in such weakly acid medium, and subjecting the disazo dye thus formed to reduction with sodium disulfide in an alkaline solution to reduce the two nitro groups to amido groups.

6. The method of producing a disazo dyestuff which comprises subjecting a dyestuff of the following composition

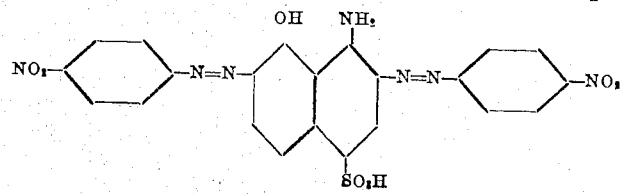

to reduction in alkaline solution by means of sodium disulfide to reduce the two nitro groups to amino groups and isolating the resulting dyestuff by the addition of sodium bisulfite and dilute hydrochloric acid.

In testimony whereof we affix our signatures.

WALTER M. RALPH.
LAWRENCE H. FLETT.